March 9, 1943.  H. W. JEWELL  2,313,074
PIPE JOINT AND COLLAR THEREFOR
Filed July 31, 1940   2 Sheets-Sheet 1

HOWARD W. JEWELL
INVENTOR.

BY

ATTORNEY.

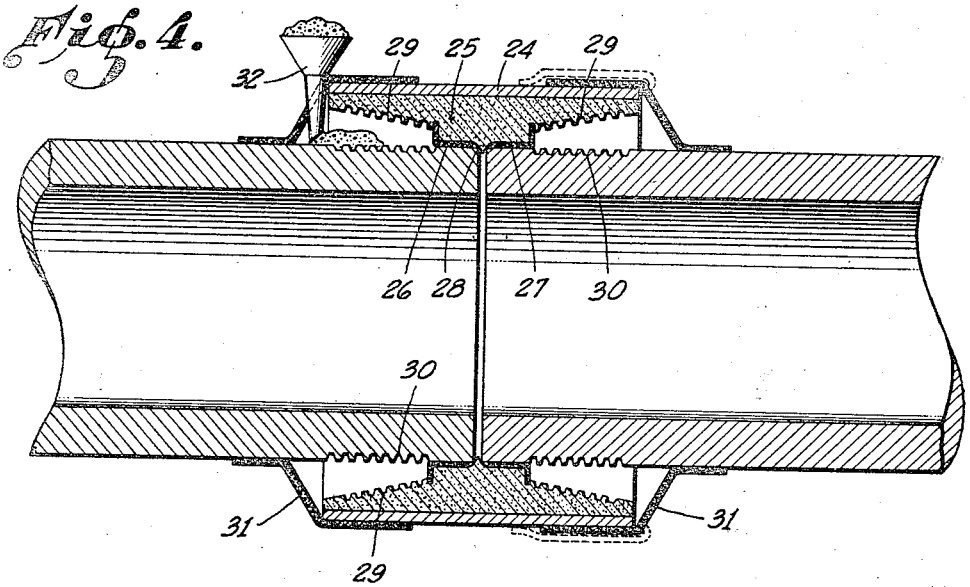
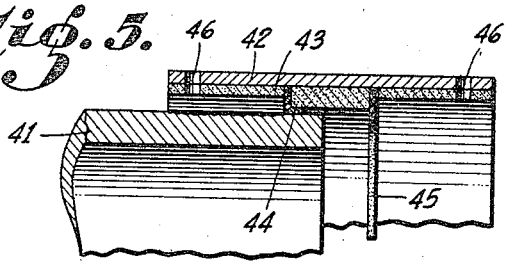
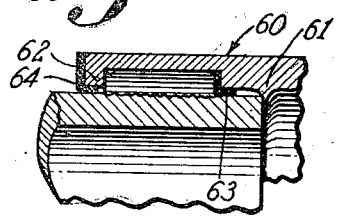
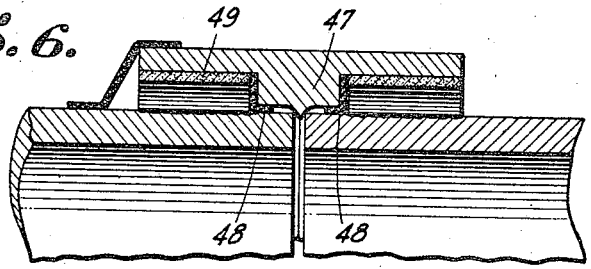
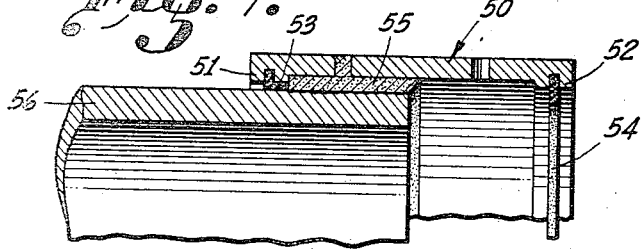
Howard W. Jewell
INVENTOR.
ATTORNEY.

Patented Mar. 9, 1943

2,313,074

UNITED STATES PATENT OFFICE 2,313,074

PIPE JOINT AND COLLAR THEREFOR

Howard W. Jewell, Los Angeles, Calif.

Application July 31, 1940, Serial No. 348,640

16 Claims. (Cl. 285—114)

This invention pertains to improvements in the joining of pipe, particularly pipe used in conveying sewage and other liquids having corrosive properties. The invention is particularly directed to means whereby sections of pipe made of ceramic compositions, cementitious compositions, and the like, may be readily and positively joined, the resulting joint being strong, leakproof, and resistant to attack by acidic or caustic solutions flowing through the pipe or conduit.

Although the means and constructions of this invention may be used in joining and laying pipe for various purposes, specific attention will be drawn to the application of this invention in the laying and joining of sewer pipe. Ordinarily, sewer lines are composed of sections of ceramic pipe (generally made by extruding clay or clay-like bodies and burning). The usual sewer pipe is of relatively short length and is provided with a bell end at one end of the pipe and a spigot end at the other end, the spigot end of one pipe being inserted into the bell end of an adjoining pipe. The annular space between the spigot and the inside of the bell is then caulked with various materials. Some attempt has been made to fill this annular space with a meltable composition such as a bitumastic mixture or a mixture of sulfur and silica. These compositions harden upon cooling and although they are resistant to the action of acids and alkalies of the character found in sewage, the shrinkage which develops in these compositions during cooling and hardening invariably causes the composition to pull away from the inside surface of the bell, leaving residual channels through which the sewage may leak.

Most sewage lines are buried. In view of the fact that waste fluids, sewage and the like are passing through the conduits almost continuously, moisture seeps through the walls of the pipe and through any cracks or leaks at the joints and attracts roots and other vegetable growth. The roots not only have a tendency to enter the cracks and disrupt the joints but in adidtion thrive in the moisture beneath the pipe and grow to such an extent that they eventually raise the pipe in sections and cause additional breaks or cracks in the joints.

The present invention is directed to a method of joining conduit which assures thorough and complete sealing and which prevents the development of leaks. The means of this invention not only positively join adjacent lengths of pipe but in addition impart great strength to the pipe line as a whole, thereby preventing disruption of the line due to external disturbances. It is to be remembered that very often a pipe line is laid in the bottom of a ditch and is supported only at irregular intervals where such line rests on rocks, a formation harder than the average of the ditch, or on high spots which have been left in the bottom. After the conduit has been covered, certain areas or zones may settle more extensively than other zones, leaving the pipe line suspended from and bridging spaced supporting zones. Unless the joints are as strong or stronger than the pipe, cracks are formed and the line begins to leak, such leakage eventually resulting in a disruption of services and necessitating repairs.

An object of the present invention is to provide means whereby pipe, conduit and the like may be laid and joined in a rapid and economical manner.

Another object is to provide joining means which permit adjacent lengths of pipe to be joined, with a minimum chance of leakage through such joints.

An object of the present invention is to provide joining collars for use in joining pipe and conduit, such collars giving rise to joints which are as strong or stronger than the pipe.

An additional object of the present invention is to provide a sewer pipe construction which is substantially leak-proof and which has a long effective life.

Still another object of the invention is to provide joining means capable of centering and gasketing the joints and facilitating the production of leakproof joints.

These and other objects of the invention will be apparent from the contemplation of the invention described hereinafter. In order to facilitate understanding, reference will be had to the appended drawings, in which:

Fig. 4 is an axial section of adjacent ends of pipe and a joining collar, showing the relationship of the parts during the final steps of a joining operation.

Fig. 5 is an axial section showing a modified collar in position on one pipe end.

Fig. 6 is another modified form of collar in position on adjoining pipe ends.

Figs. 7 and 8 are still further modifications of the invention.

In carrying out the methods of the present invention and in using the joining collars, pipe or conduit is employed, such pipe or conduit having plane ends. It has been found that the bells ordinarily formed on one end of pipe are a source of weakness and in accordance with the present invention, plane ended pipe is employed. Furthermore, in order to produce a sewer line of greatest stability and strength and of longest life, it is desirable to employ ceramic pipe provided with a slip glaze on the internal surface. This type of glazed pipe is to be distinguished from what is normally termed "salt glazed pipe." Salt glazed pipe is not glazed but instead has been subjected to the fumes of alkali during the end of the burning operation, the alkali forming an incomplete and discontinuously associated film on the surfaces. Such alkali silicates are not resistant to the acidic conditions ordinarily encountered in sewage.

Figure 1:
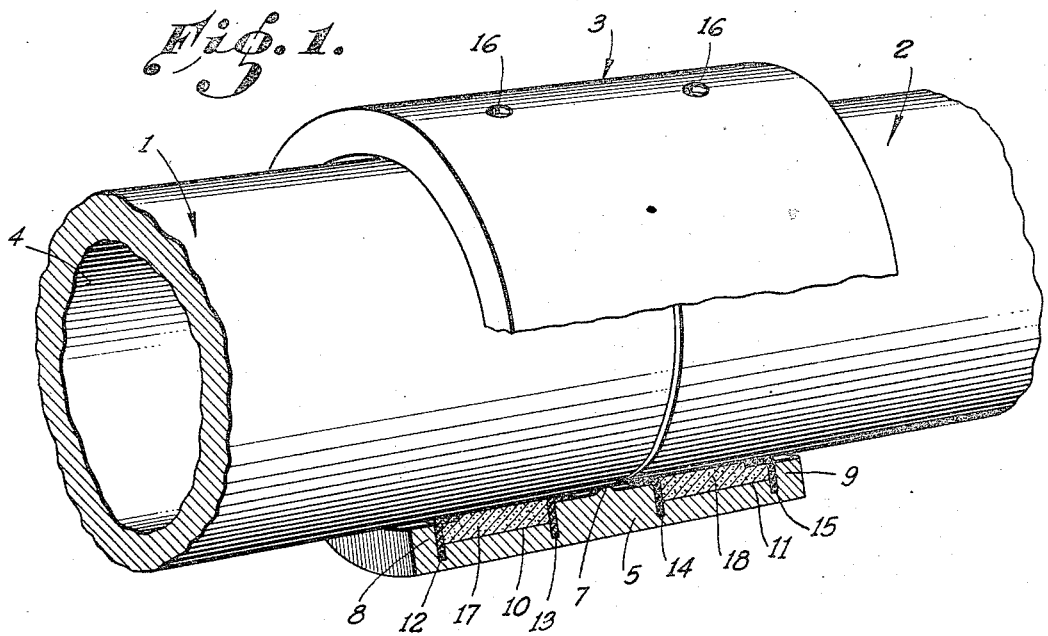
Fig. 1 is a perspective, partly broken away, of a joint made between two coaxially disposed pieces of pipe, with a joining collar of this invention.

In Fig. 1 the ends of two ceramic pipes 1 and 2 are shown in substantially abutting relation within a joining collar 3. An internal slip glaze is indicated at 4. The collar 3 is provided with an inwardly extending centering and seating ring, generally indicated at 5, the inner surface of such seating and centering ring, indicated at 6, being provided with a smooth, glazed and impervious surface and with an inwardly extending rib 7 adapted to contact the ends of the pipes 1 and 2. The centering rib 7 thus positively positions each pipe end within the collar 3. In the embodiment shown in Figs. 1, 2 and 3, each ring or collar 3 comprises a cylindrical body portion having inwardly extending end flanges 8 and 9, such end flanges having an internal diameter only slightly greater than the external diameter of the pipe with which the joining ring is to be employed. Recessed portions having the internal surfaces 10 and 11 are formed between the ends flanges 8 and 9 and the centrally positioned centering and seating ring 5. Flexible annular flange members are carried by the ring or collar 3, such annular flange members being indicated at 12, 13, 14 and 15. The inwardly extending edges of the flanges 12 to 15 are free to move and form diameters which are slightly smaller than the external diameter of the pipe 1 and 2 as best seen from an examination of Figs. 2 and 3. When the end of a pipe is inserted into a collar of the character described, the flexible and resilient inner edge portions of the flange members 12 and 13 are extended and deformed somewhat and are caused to conform to and encircle the pipe. As shown in Fig. 1, the flange member 13 not only closely encircles the outer surface of the pipe 1 but acts as a gasket between such pipe and the acid-resisting glazed surface 6 of the centering and seating ring 5. The inner edge portion of the ring 12 acts as a gasket and closely conforms to and encircles the pipe 1, thereby preventing the percolation of soil waters into the space between the rings 12 and 13. After the collar 3 has been slipped onto the end of a pipe 1, a suitable sealing material may be poured through a pour hole 16 leading to the recess or annular space having the outer surface 10. Sealing materials preferably employed comprise thermoplastic substances and compositions, i. e., compositions which are capable of being liquefied by the aid of heat and which will set and harden at lower or atmospheric temperatures. Bituminous compositions, phenolic compositions, fusible mixtures such as those containing sulfur, silica and the like, may be employed to good advantage. A filling of sealing material is indicated at 17 and 18.

Figure 2:
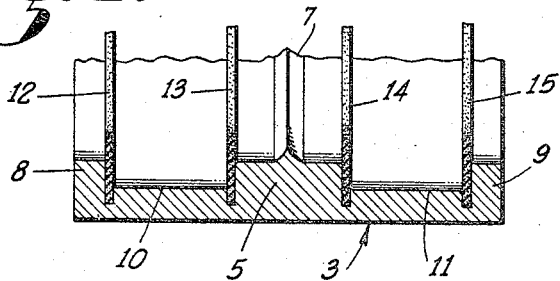
Fig. 2 is an axial section through a portion only of a collar used in Fig. 1.

As shown in Fig. 2, the inwardly extending edge areas of the flexible annular flange members 12, 13, 14 and 15 form an internal diameter which is smaller than the external diameter of the pipe to which the collar 3 is to be applied. The outer edges of the said flange members may be seated in grooves or recesses formed on the internal surfaces of the collar.

Figure 3:
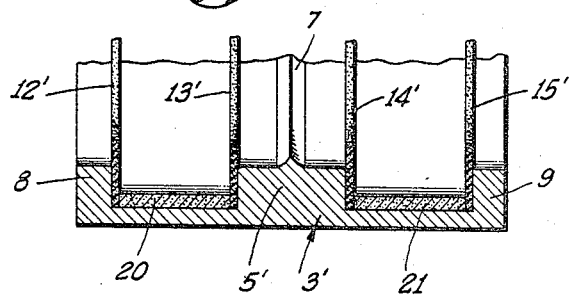
Fig. 3 is an axial section through a slightly modified form of collar.

The slightly modified form of collar shown in Fig. 3 comprises a cylindrical body portion 3', a centrally positioned, inwardly extending seating and centering ring 5', and includes the rings or flexible flange members 12' to 15', but their outer edges are not seated in grooves but instead are retained in position by means of a layer of thermoplastic material 20 and 21. This thermoplastic material is preferably compatible with the thermoplastic material which is to be used in actually filling the annular space between flexible flange members and the outer surface of a pipe inserted into the collar.

The layer of thermoplastic material should be of sufficient thickness so that after a pipe is inserted into the collar, only a relatively small annular space remains between the inner surface of this thermoplastic material and the outer surface of the pipe. When a compatible thermoplastic material is poured through the pour hole (in completing the seal between the collar and a pipe), the hot thermoplastic material will have a tendency to melt the inner surface of the layer 20 and become intimately associated and fused therewith at such surface, thus producing an integral seal free from the shrinkage cracks which occur in the event a relatively thick annular ring of thermoplastic material is cast. A collar containing precast sealing zones composed of a thermoplastic material is one of the characteristic contributions of this invention.

A modified form of joining sleeve or collar is shown in Fig. 4. As there shown, the collar may comprise an outer band or sleeve 24 of steel, cast iron or other suitable material. Cast within it is an annular body 25 formed of suitable material. Although the body 25 is preferably made of a thermoplastic material, I wish to include materials such as lead, cement, and the like. It will be noted that inwardly extending flexible flange members 26 and 27 may be attached to or cast into the body 25 on either side of a centering and seating boss or sleeve 28.

The inner surface of the body 25 on either side of the centering and guiding boss 28 may be flared outwardly and provided with score marks, scarifications or grooves, indicated at 29. Very often the outer surfaces of the pipe adjacent its end are also provided with score marks or grooves, such as are indicated at 30.

When the ends of pipe to be joined by the device shown in Fig. 4 are inserted into the collar, the inwardly extending edge portions of the flexible flange members 26 and 27 act as gaskets between the outer surface of the pipe and the centering boss 28. Wide flexible bands (preferably elastic) are then placed over the edges of the sleeve so as to cover the opening between the outer surface of the pipe and the outer surface of the sleeve, such bands being indicated at 31. Suitable sealing material may then be poured into the annular space between the outer surface of the pipe and the inner surface of the sleeve as, for example, through a funnel 32 inserted through an opening formed in the flexible band 31. This sealing compound or material is preferably thermoplastic so as to set upon cooling, the band 31 effectively preventing excessive quantities of the material from being lost and acting as a mold therefor.

The modified form of collar shown in Fig. 5 as applied to one end of a pipe 41, comprises an outer metal collar 42 provided with an inner liner of thermoplastic material 43. Inwardly extending flexible flange members 44 and 45 are shown in spaced relation embedded in the inner liner 43 but near the central zone of the collar. Pour holes 46 are indicated extending through the metal collar and its inner liner for the purpose of facilitating the introduction of a sealing compound into the annular space between the collar and the exterior of a pipe. It will be noted that the flexible, inwardly extending flange member 44 acts as a gasket and seal between the pipe and the resistant thermoplastic filling material in the central zone of the collar.

The form of collar shown in Fig. 6 comprises a virtually vitrified ceramic body member 47 having a centrally disposed, inwardly extending guiding, centering and seating ring and a flexible, inwardly extending flange member 48 on either side thereof. A thermoplastic, resistant, sealing composition 49 is cast on the inner surfaces of the end portions of the collar 47, such composition not only holding the outer edge areas of the flexible members 48 in position but in addition reducing the annular space between the pipe and the collar which needs be filled with a sealing material. The final sealing material is not shown in position in Fig. 6.

A still further modification of the present invention is shown in Fig. 7, wherein the collar 50 is provided with inwardly extending integral flanges 51 and 52 at its ends. Said flanges may contain inwardly extending, flexible flange members 53 and 54. A suitable thermoplastic sealing material 55 is shown in position between the collar 50 and the pipe 56, such sealing material being introduced through a suitable pour hole.

As shown in Fig. 8, the collar 60 may be provided with the inwardly extending, guiding and centering ring 61 and inwardly extending integral flanges 62 at the ends of the collar 60. The flexible flange members 63 may be positioned within the collar and adjacent the inwardly extending centering ring 61; these flanges 63 being cemented or otherwise held in position within the collar 60. The "in" surfaces of the collar 60 may have inwardly extending flexible flange members 64 attached thereto by any suitable cement or adhesive. These flange members 64 being of sufficient size so as to extend between the flange 62 and the pipe. The resilient character of the flange members 64 prevents breakage of collars and of pipe in the event annular displacement occurs between the collars and the pipe. Moreover the collars 60 may be more readily stacked, transported and handled without breakage, the flanges 64 acting as shock absorbers when the collars 60 are stacked. It is to be understood that the annular space between the flanges 63 and 64 is filled with any suitable cementing material, preferably of the character described hereinbefore.

In general, it may be stated that the cylindrical body portions of the joining collars of this invention preferably have a length not less than about 0.7 of the outer diameter of the pipe for use therein, since it has been found that collars of such length give rise to exceptionally strong and stable joints. Differently expressed, in most instances it has been found that the cylindrical body portion of the collar should have a length not less than 0.8 of its external diameter. These minima may be reduced somewhat, however, in the event the collar is made of an exceptionally strong material such as metal and not from a ceramic burned clay composition. It is also to be understood that collars may be made of cementitious compositions and suitably reinforced by contained coils of wire or the like.

The inwardly extending flexible flange members or rings may be made of rubber, leather, synthetic rubber or other flexible and resistant material capable of withstanding the conditions encountered in practice. Certain forms of synthetic rubber are better suited than vulcanized rubber compositions since the synthetic forms are slightly more resistant to the action of oils, acidic solutions, etc.

As a result of the improvements described herein, sewage lines and other conduits constructed in accordance with the teachings of this invention have been found to withstand internal pressures and bending stresses which are quite remarkable. Ordinary bell and sewer pipes will not support their own weight, when carefully connected together, over a span equivalent to two pipe lengths. The present invention permits the construction of a conduit which will not only support its own weight over a span in excess of two pipe lengths but in addition will withstand a full load of water over such span without the development of any leaks. Actual loading tests show that although the older construction will break down under no load at all, lines made in accordance with this invention will withstand loads of as high as 400 pounds per square inch without the development of leaks.

This application is a continuation-in-part of a co-pending application Serial No. 206,488 filed May 6, 1938, and entitled "Pipe joint and method of making same."

I claim:

1. In a pipe joint collar, the combination of: a cylindrical body adapted to receive the end of a pipe; a flexible annular flange member carried within and attached to said body, the inwardly extending edge portion of said flange member being free to conform to and encircle the surface of a pipe inserted into said cylindrical body, and a layer of thermoplastic material on the inner surface of said body, said thermoplastic material being compatible with sealing material used in sealing the joint between said body and a pipe.

2. In a pipe joint collar, the combination of: a cylindrical body adapted to receive the end of a pipe; a flexible annular flange member carried within said body, the inwardly extending edge portion of said flange member being flexible and free to conform to and encircle the surface of a pipe inserted into said cylindrical body, and a layer of thermoplastic material on the inner surface of said body holding the outwardly extending edge of said flexible flange in position, said thermoplastic material being compatible with sealing material used in sealing the joint between said body and a pipe.

3. A pipe joint collar comprising: a unitary cylindrical body adapted to receive the end of a pipe; and a pair of flexible spaced annular flange members within and attached to said body, the inwardly extending edges of said flange members being adapted to closely encircle the surface of a pipe inserted into said body.

4. In a pipe joint collar, the combination of: a unitary cylindrical body provided with inwardly extending flanges at the ends thereof, said body being adapted to receive the end of a pipe, and a pair of spaced inwardly extending flexible annular flange members within and attached to the body, the inwardly extending edges of said flange members being flexible and adapted to conform to and encircle the surface of a pipe inserted into said body.

5. A pipe joint comprising a plain end pipe, a unitary cylindrical collar encircling the end of said pipe and extending longitudinally therebeyond, a flexible annular flange member within and attached to said collar by its outer edge portions, the inner portions being resilient and flexible and in deformed contact with the outer surface of the pipe, and a seal of thermoplastic material in the annular space between said collar and the outer surface of said pipe.

6. In a pipe joint collar, the combination of: a unitary cylindrical body adapted to receive the end of a pipe; an inwardly extending centering and seating ring carried by the inner surface of said cylindrical body; inwardly extending integral flanges at the ends of said body portion and spaced from said seating ring; flexible annular flange members carried within and attached to said body on each side of said centering and seating ring, and flexible annular flange members carried by and attached to the ends of said body, said flange members being flexible and free to conform to and encircle the surface of a pipe inserted into said body and to extend between such pipe and said centering and seating ring and between said pipe and the end flanges.

7. In a pipe joint collar, the combination of: a unitary, cylindrical, ceramic body adapted to receive the end of a pipe; an inwardly extending centering and seating ring carried by the inner surface of said cylindrical body, and a flexible annular flange member carried within and attached to said body adjacent each side of said centering and seating ring, said flexible flange members having internal diameters slightly smaller than the outer diameter of a pipe to be inserted into the collar, the inwardly extending edge portions of said flange members being flexible and free to conform to and encircle the surface of a pipe inserted into said body and to extend between such pipe and said centering and seating ring.

8. In a pipe joint collar, the combination of: a unitary, ceramic, cylindrical body adapted to receive the end of a pipe; an inwardly extending centering and seating ring carried by the inner surface of said cylindrical body and a flexible annular flange member carried by and attached to said body, said flange having an internal diameter slightly smaller than the outer diameter of a pipe to be inserted into such collar, the inwardly extending edge portions of said flexible flange member being free to conform to and encircle the surface of a pipe inserted into said cylindrical body.

9. In a pipe joint collar the combination of: a unitary, cylindrical, ceramic body adapted to receive the end of a pipe; an inwardly extending centering and seating ring carried by the inner surface of such cylindrical body and a pair of flexible, spaced, annular flange members attached to said cylindrical body on one side of said centering and seating ring, said flexible flange members having internal diameters slightly smaller than the diameter of a pipe to be inserted into such collar, the inwardly extending edge portions of said flange members being free to conform to and encircle the surface of a pipe inserted into said collar.

10. A pipe joint collar comprising: a unitary, cylindrical, ceramic body adapted to receive the end of a pipe; an inwardly extending centering and seating ring carried by the inner surface of such cylindrical body; a pair of flexible, spaced, annular flange members attached to said cylindrical body on one side of said centering and seating ring, said flexible flange members having internal diameters slightly smaller than the diameter of a pipe to be inserted into such collar, the inwardly extending edges of said flange members being flexible and free to conform to and encircle the surface of a pipe inserted into said collar; a pour hole formed in said body between said pair of flexible flange members; and a layer of thermoplastic material on the inner surface of said body, said thermoplastic material being compatible with sealing material poured through the pour hole for sealing the joint between said body and a pipe.

11. In a pipe joint collar, the combination of: a cylindrical ceramic body adapted to receive the end of a pipe; a pair of flexible annular flange members attached to said body by their outer edge portions, the flexible members having internal diameters slightly smaller than the outer diameter of a pipe to be inserted into such collar, the inwardly extending edge portion of said flexible members being free to conform to and encircle the surface of a pipe inserted into said collar.

12. A pipe joint collar comprising: a cylindrical ceramic body adapted to receive the end of a pipe; a pour port extending through the wall of said body; a pair of flexible annular flange members carried within and attached to said body, the flexible members having internal diameters slightly smaller than the outer diameter of a pipe to be inserted into such collar, the inwardly extending edges of said flexible members being free to conform to and encircle the surface of a pipe inserted into said collar, said flexible members being attached to the cylindrical body by thermoplastic material compatible with liquefied, thermoplastic sealing material poured through the pour port for sealing the joint between the collar and a pipe.

13. A pipe joint comprising a plain end pipe, a unitary ceramic cylindrical collar encircling the end of said pipe and extending longitudinally therebeyond and a pair of longitudinally spaced, flexible annular flange members within said collar, said flange members having internal diameters slightly smaller than the outer diameter of the pipe, the inwardly extending edges of said flexible members conforming to and gripping the outer surface of the pipe and a seal of thermoplastic material in the annular space between said collar, the flanges and the outer surface of said pipe.

14. A pipe joint comprising a plain end pipe, a unitary cylindrical ceramic collar encircling the end portion of said pipe and extending longitudinally therebeyond, an inwardly extending centering and seating ring carried by the inner surface of said collar and cooperating with the end of said pipe and a flexible annular flange member within said collar adjacent said centering and seating ring, said member having an internal diameter slightly smaller than the outer diameter of the pipe, the inwardly extending edge of said member being free to conform to and encircle the surface of the pipe and extending between such pipe and such centering and seating ring.

15. A pipe joint collar comprising: a unitary cylindrical body adapted to receive the end of a ceramic pipe; an inwardly extending centering and seating ring on the inner surface of the cylindrical body and integral therewith; a flexible annular flange member positioned within said body on each side of and adjacent said centering and seating ring, each of said flange members being attached at its outer edge portions to said body by thermoplastic material; the inwardly extending edges of said flange members being flexible and free to conform to and encircle the surface of a ceramic pipe inserted into said body and to extend between such pipe and said centering and seating ring.

16. A pipe joint collar comprising: a unitary cylindrical body adapted to receive the end of a ceramic pipe; an inwardly extending centering and seating ring on the inner surface of the cylindrical body and integral therewith; a pair of pour holes formed in said body, said pour holes being spaced by the centering ring; a flexible annular flange member positioned within and attached to the inner surface of said body on each side of and adjacent the centering ring, each of said flange members being attached at its outer edge portions to said body by thermoplastic material, the inwardly extending edge portions of said flange members being flexible and free to conform to and encircle a ceramic pipe inserted into the body and to extend between such pipe and the seating and centering ring; and an additional flexible flange member attached to each end of said body, the internal diameters of said members being smaller than the diameter of the pipe to be inserted into said collar, the inwardly extending edge portions of such additional flange members being flexible and free to conform to and encircle a pipe inserted into the collar whereby liquefied thermoplastic may be poured into a pour hole for sealing the joint between said body and a pipe and such thermoplastic will be retained therein.

HOWARD W. JEWELL.